Jan. 16, 1962  S. M. RUBENS ETAL  3,017,607
ACOUSTIC IMPEDANCE DETECTING APPARATUS

Filed July 29, 1952  2 Sheets—Sheet 1

INVENTORS
SIDNEY. M. RUBENS
GALE WHITE
BY
*J.D.O'Brien*
*R.M.Hicks*
ATTORNEYS

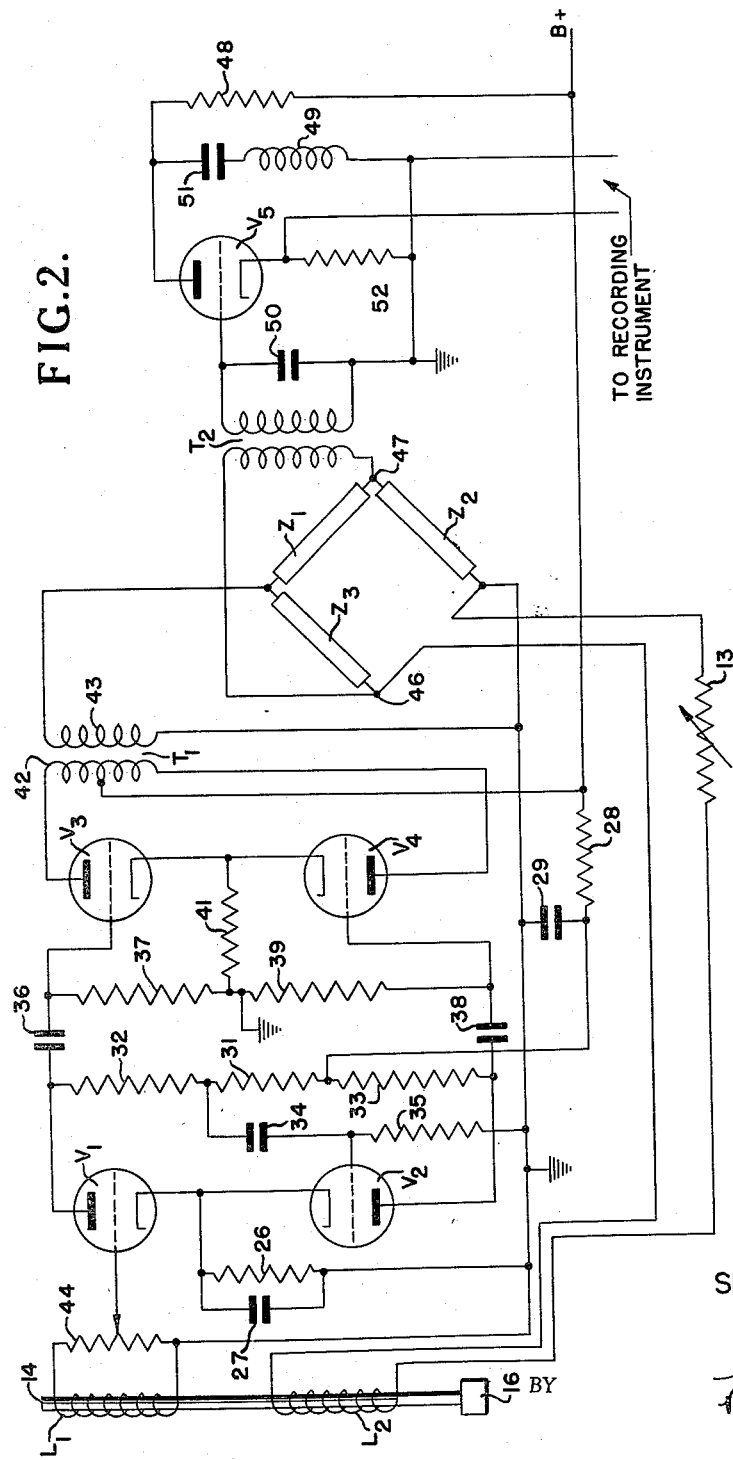

United States Patent Office 3,017,607
Patented Jan. 16, 1962

3,017,607
ACOUSTIC IMPEDANCE DETECTING APPARATUS
Sidney M. Rubens, St. Paul, Minn., and
Gale White, Dallas, Tex.
Filed July 29, 1952, Ser. No. 301,618
4 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention comprises novel and useful improvements in a system for detecting the presence of the wake of a vessel in a body of water, and more particularly pertains to the novel method and apparatus for the detection of a change of the acoustic impedance of a medium such as would be caused by the presence of air bubbles therein.

There are several physical characteristics by which the wake of a ship may be distinguished from the ambient water which is undisturbed by the ship's passage. The wake consists of turbulent water containing air bubbles. Because of the turbulent mixing, the velocity and temperature distribution throughout the wake differ from the same distributions in the undisturbed water beyond the wake boundary. The air bubbles alter the transmission of both light and sound in water so that thermal, mechanical, optical and acoustic methods of wake detection are all possible.

The instant invention relates to a method and apparatus whereby the wake of a vessel is detected by measuring the change in the characteristic acoustic impedance of the medium in going from bubble-free water outside of the wake, to the bubbly water in the wake. Because of the presence of bubbles in the medium, the velocity of sound in the medium, and hence the acoustic impedance of the medium is changed. The electrical impedance of an oscillating hydrophone, transmitting into the medium, would correspondingly be changed when brought into the wake from the bubble-free medium outside the wake, and this change is measured to indicate the presence of the wake.

The method for detection of change in the impedance of the hydrophone consists of the employment of the oscillating hydrophone in an impedance bridge so that the electrical element of the hydrophone serves as one arm of the bridge. The bridge is balanced in bubble-free liquid, and when bubbles come near the oscillating piston of the hydrophone, the change in the acoustic impedance of the medium produced thereby causes a corresponding change in the electrical impedance of the arm of the bridge containing the hydrophone element. The bridge becomes unbalanced, which unbalance is electrically detected.

An important object of this invention is to provide a system for the detection of changes in the acoustic impedance of a medium through the detection of the correlative change in the electrical impedance of an electromechanical transducer which transmits into the medium.

Another object of this invention is to provide a system for detecting the change in the electrical impedance of an electro-mechanical transducer which transmits into the ambient medium, as the transducer passes into a region having relatively different acoustic impedance, which system provides for the balancing out of the electrical impedance of the transducer due to transmission in the ambient medium, whereby the changes in the electrical impedance of the transducer upon passing through the region of relatively different acoustic impedance may be more accurately detected.

Another object of this invention is to provide an acoustic impedance detecting system in which an electromechanical transducer having an electrical impedance correlative with the acoustic impedance of the medium into which the transducer transmits is employed in one leg of a balanced bridge circuit, whereby a change in the acoustic impedance of the medium produces a correlative unbalance in the bridge.

A further object in this invention is to provide an acoustic impedance detecting system in which an electromechanical transducer having an electrical impedance correlative with the acoustic impedance of the medium into which the transducer transmits is employed in one arm of a balanced alternating current bridge circuit, and which transducer also serves to control the frequency of the oscillator which energizes the bridge.

Other objects and many of the attendant advantages of this invention will be readily appreciated as the same becomes better understood by reference to the following detailed description when considered in connection with the accompanying drawings wherein:

FIG. 2 is a schematic diagram of a portion of the preferred form of apparatus for the detection of changes in the acoustic impedance of a medium.

It is well established that the velocity of sound and hence the acoustic impedance of a medium such as water is a function of the size and distribution of air bubbles in the water as well as the temperature of the water. The passage of a vessel through water produces a region in the wake thereof in which there are clouds of bubbles which tend to maintain their identity for a period of time after the passage of the vessel. Additionally, the region in the wake of a vessel has a relatively higher temperature than the ambient medium. However, the change in the acoustic impedance of the water due to the presence of bubbles therein is small as compared to the total impedance of the water.

It is also established that the bubbles in the water tend to resonate at a frequency determined by the size of the bubbles, the smaller bubbles resonating at a relatively higher frequency than the larger bubbles. Further, the smaller bubbles persist in the wake for a relatively longer period of time than the larger bubbles.

The impedance of a piston which radiates into a medium has both resistive and reactive components, the resistive component being a function of various factors, one of which is the velocity of sound in the medium. Since the number of bubbles which are resonant at the frequency of transmission affect the magnitude of the reactive component of the transducer impedance, it is apparent that by transmitting into the medium at a frequency which is well below the resonant frequency of the small bubbles in the wake, it is possible to distinguish fresh wakes from old wakes.

The method and apparatus of the instant invention is particularly adapted to detect the wake of a vessel by the detection of the change in the electrical impedance of a transducer in going from bubble-free water into the bubbly water characteristic of the vessel's wake. The detection of the change in the transducer impedance is effected by energizing the electro-mechanical transducer through a normally balanced bridge circuit in such a manner that a change in the electrical impedance of the transducer, as would be caused by a change in the acoustic impedance of the medium into which the transducer transmits, produces a correlative unbalance in the bridge circuit. The acoustic method of wake detection has advantages over the optical method of wake detection since the acoustic method minimizes the effects of suspended material in the water other than bubbles or organisms containing vacuoles, which suspended material would produce significant indications in an optical type wake detector.

Figure 1:
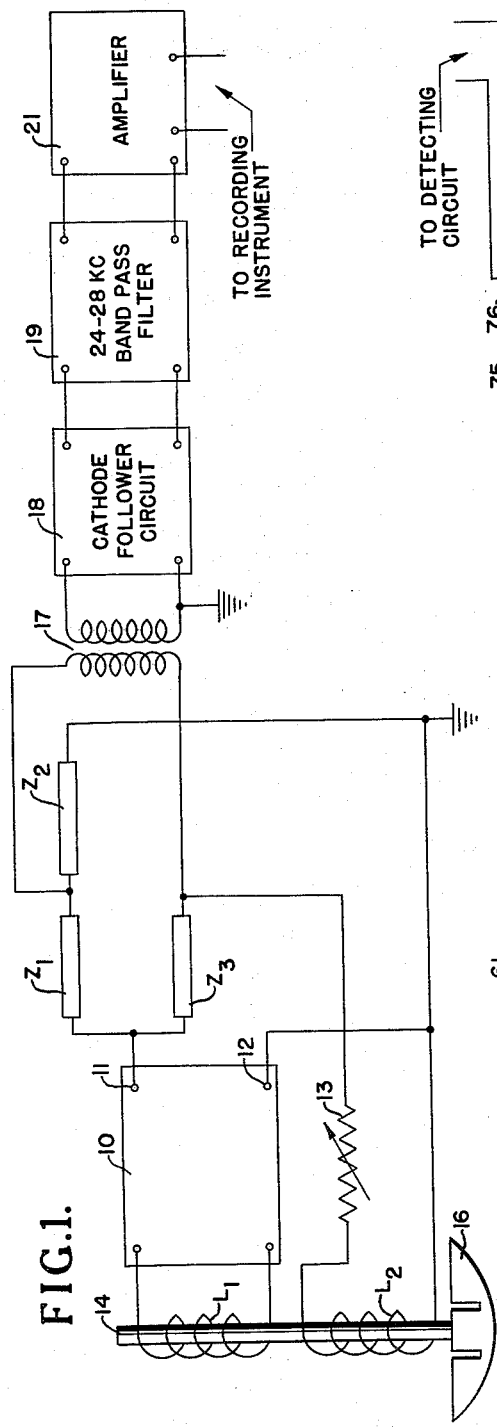
FIG. 1 is a diagrammatic view of a preferred form of apparatus for detecting changes in the acoustic impedance of a medium.

Reference is now made more specifically to the diagrammatic view of the impedance detector apparatus, shown in FIG. 1 of the drawings. The acoustic impedance detector includes an amplifier 10, the output of which appears across terminals 11 and 12 and is applied to an alternating current bridge circuit, the four legs of which are respectively made up of impedance elements $Z_1$, $Z_2$, $Z_3$, and the composite impedance of calibrating resistor 13 and coil $L_2$. The coil $L_2$ is magnetically coupled to a magnetostrictive element 14, which element constitutes a portion of a magnetostrictive transducer having a transmitting head 16. A coil $L_1$ is also coupled to the rod, the voltages induced in the coil $L_1$ being applied into the input of the amplifier 10. Thus the output of the amplifier 10 is applied to coil $L_2$, through the bridge circuit, and the feed back necessary to sustain oscillations in the amplifier is provided by the coupling of coil $L_2$ to coil $L_1$ through the magnetostrictive element 14. Such an oscillator will oscillate at any one of the normal modes of the rod, and in order to eliminate all but one mode of vibration, the amplifier must be sharply tuned to this desired frequency.

The oscillator frequency is controlled by the magnetostrictive element 14 which tends to maintain the frequency output of the amplifier constant at one of the natural modes of vibration of the element 14. The output of the impedance bridge, which is zero for balance conditions in the bridge circuit, is applied through transformer 17 to the input of a cathode-follower circuit 18 and the output of the cathode-follower circuit is filtered by a band-pass filter 19 having a band width sufficient to pass only those frequencies in the neighborhood of the oscillator frequency. The output of the band pass filter is applied through an amplifier and rectifier 21 to a suitable recording instrument [not shown].

Reference is now made more specifically to the schematic diagram of the direct feedback type magnetostriction oscillator and the bridge circuit illustrated in FIG. 2 of the drawings. The oscillator includes an amplifier stage including tube $V_1$, a phase inverter stage including tube $V_2$, and a push-pull output stage including tubes $V_3$ and $V_4$. Grid bias for the amplifier stage and phase inverter stage is provided by a common cathode biasing circuit including resistor 26 and condenser 27. Plate potential for tube $V_1$ is applied from plate supply source $B_1$ through the decoupling circuit comprising resistor 28 and condenser 29 through plate load resistors 31 and 32, plate potential for tube $V_2$ being applied through the same decoupling circuit including resistor 28 and condenser 29, through plate load resistor 33 to the plate of tube $V_2$. The output of tube $V_1$, which is in phase opposition to the signal applied to the grid thereof, is applied through condenser 34 across grid resistor 35, to the control grid of tube $V_2$. The output of tube $V_1$ is also applied through condenser 36 across grid resistor 37 to the control grid of tube $V_3$, the output of tube $V_2$, which is 180° out of phase with the output of tube $V_1$, being applied through condenser 38 across grid resistor 39 to the control grid of tube $V_4$. Push-pull operated tubes $V_3$ and $V_4$ have a common cathode biasing resistor 41 and the plates thereof are connected to the center-tapped primary winding 42 of transformer $T_1$. As is conventional, plate potential from source $B_1$ is applied to the tap on the primary winding 42 of transformer $T_1$. The output of the push-pull operated tubes $V_3$ and $V_4$ is taken off the secondary winding 43 of transformer $T_1$, and applied to the alternating current bridge circuit having four arms respectively including impedance elements $Z_1$, $Z_2$, $Z_3$ and the composite impedance of coil $L_2$ and calibrating resistor 13.

Coil $L_2$ is coupled through the magnetostrictive element 14 to the coil $L_1$, and the output voltage across coil $L_1$ is applied across potentiometer 44 to the control grid of tube $V_1$, as a feed back voltage. The phase and amplitude of the voltage applied to tube $V_1$ is adjusted so as to sustain oscillations in the amplifier. Such an oscillator will oscillate at one of the normal modes of the magnetostrictive element 14.

The impedance elements $Z_1$, $Z_2$ and $Z_3$ in the alternating current bridge circuit are adjusted to such values that balance conditions are realized in the bridge circuit when the magnetostrictive element 14 having a transmission head 16 thereon functions as a transducer, and transmits into a medium such as water. Under these conditions, no signal appears across the terminals 46 and 47 of the bridge circuit. However, when the transducer including the magnetostrictive element 14 and transmission head 16 moves into a region having a relatively different acoustic impedance, there is a corresponding change in the electrical impedance of the coil $L_2$, and a corresponding unbalance in the bridge circuit. A signal corresponding to the unbalance is applied through the transformer $T_2$ which is tuned by condenser 50 across the secondary thereof to pass only those signals of fundamental transmission frequency to the control grid of the cathode-follower coupled tube $V_5$. Plate potential for tube $V_5$ is applied through resistor 48 across an impedance network comprising inductor 49 and condenser 51 which is tuned to be anti-resonant at the frequency range of the oscillator to provide selective response to signals of that frequency. The output signal appears across the cathode load resistor 52.

As shown in FIG. 1, the output of the cathode-follower stage is applied to a suitable filter, and then amplified and rectified before being applied to the recording instrument.

Figure 3:
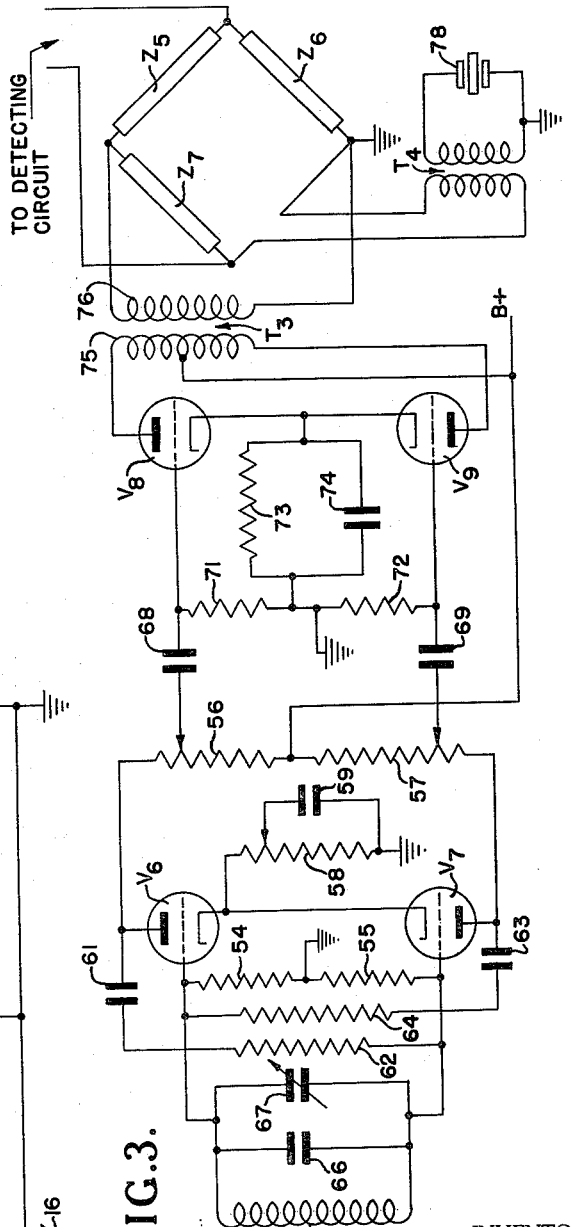
FIG. 3 is a modified form of apparatus for the detection of changes in the acoustic impedance of a fluid medium.

FIG. 3 illustrates a modified form of oscillator and transducer. In this embodiment a negative resistance oscillator including tubes $V_6$ and $V_7$ is employed, plate potential for tubes $V_6$ and $V_7$ being applied through resistors 56 and 57 respectively. Tubes $V_6$ and $V_7$ have a common cathode biasing circuit including potentiometer 58 and condenser 59, potentiometer 58 being adjustable to vary the amount of negative feedback in a manner well understood by those skilled in the art. The plate of tube $V_6$ is coupled through condenser 61 and resistor 62 across grid resistor 55 to the control of $V_7$, and the plate of $V_7$ is coupled through condenser 63 and resistor 64 across grid resistor 54 to the control grid of tube $V_6$. A tank circuit comprising inductor 65 and condensers 66 and 67 is connected to the control grids of tubes $V_6$ and $V_7$, as is conventional. The output of the negative resistance type oscillator is taken from variable taps on the resistors 56 and 57 and applied through condensers 68 and 69 across grid resistors 71 and 72 respectively, to the control grids of the push-pull operated tubes $V_8$ and $V_9$. The tubes $V_8$ and $V_9$ have a common cathode biasing circuit including resistor 73 and condenser 74, the plates of tubes $V_8$ and $V_9$ being coupled to the primary winding 75 of transformer $T_3$, the secondary winding 76 of which is connected to a suitable alternating current bridge circuit. The first, second and third legs of the bridge circuit respectively comprise impedance elements $Z_5$, $Z_6$ and $Z_7$, the fourth leg of the bridge comprising a crystal type of transducer 78 which is coupled to the bridge circuit by transformer $T_4$. As in the preceding embodiment, the output of the bridge circuit appearing across terminals 81 and 82 is applied to a suitable detecting circuit.

From the foregoing it is thought that the operation of the device may be readily understood. The electromechanical transducer is energized through the bridge circuit, and the latter is adjusted so as to obtain balance conditions when the transducer is transmitting into the surrounding medium, such as water. When the transducer passes into a region having relatively different acoustic impedance, such as into the bubbly water characteristic of the wake of a vessel, the electrical impedance of the transducer changes correspondingly, thereby producing an unbalance in the bridge circuit, the unbalance being a measure of the change of the acoustic impedance of the medium.

When the hydrophone is utilized to detect the change in the acoustic impedance of a fluid medium such as water, due to the presence of bubbles therein, whether the change in the acoustic impedance will be largely resistive or reactive will be determined by the bubble distribution. It has been ascertained that by utilizing a comparatively low frequency of transmission, the number of bubbles which will resonate at the frequency of the hydrophone will not be large, and under those conditions the resistive and reactive changes in impedance will be comparable.

In order to facilitate calibration of the device, a variable impedance such as resistor 13 is provided in the arm of the bridge containing the transducer. By suddenly changing value of the calibration resistor 13, after balanced conditions have been obtained in the bridge circuit, a correlative reading of the recording meter is obtained, which reading may be used as a comparison with the readings obtained by changes in the acoustic impedance of the medium. It is to be noted, however, that the deflection accompanying sudden changes in the value of the calibrating resistor is due to a purely resistive unbalance in the bridge, whereas the deflection due to a change in the acoustic impedance of the medium is due to both resistive and reactive changes in impedance and hence only permits a qualitative comparison.

It has been further ascertained that the relatively smaller bubbles, which resonate at higher frequencies, persist in the vessel's wake for many minutes, and consequently it has been found desirable to use a hydrophone oscillating at low frequencies, such as 5 to 10 kc., to distinguish fresh wakes from older wakes.

Because of mixing of water in the wake, the temperature of the water at a given depth of the wake may differ by several degrees centigrade from the water at the same depth outside the wake. This change in temperature is accompanied by a corresponding change in the velocity of sound, which also changes the characteristic acoustic impedance of the wake.

The wake detecting method and apparatus of the instant invention thus detects changes in the acoustic impedance of the medium, such as water, due both to the presence of the bubbles and the rise in temperature characteristic of the vessel's wake.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for detecting the wake of a vessel moving through a body of water comprising a hydrophone having an electrical circuit and adapted to be positioned in said body of water, a normally balanced bridge circuit with four legs, the electrical circuit of said hydrophone connected to form one of the legs of said bridge circuit, oscillator means connected to said bridge for suppling an A.C. voltage thereto, detector means connected to said bridge for detecting an unbalance in said bridge when a change in the acoustic impedance in said body of water near said hydrophone caused by the wake of a vessel is reflected in a change of impedance in the electrical circuit of said hydrophone.

2. Apparatus for detecting a change in the acoustic impedance of a liquid medium comprising a hydrophone having an electrical circuit and adapted to be positioned in said liquid medium, a bridge circuit, the electrical circuit of said hydrophone connected as a leg of said bridge circuit, oscillator means connected to said bridge circuit and operative to energize said bridge circuit, balancing means connected in a leg of said bridge circuit whereby said bridge may be balanced, indicating means connected to said bridge circuit for indicating an unbalance in said bridge circuit whereby a change in the electrical circuit of said hydrophone reflected by a change in the acoustic impedance of said liquid medium will be indicated.

3. Apparatus for detecting the wake of a vessel moving in a body of water comprising a transducer adapted to the acoustic impedance of water, a bridge circuit, said transducer connected to one leg of said bridge circuit, bridge balancing means in another leg of said bridge, circuit oscillator means including an amplifier and connected to said bridge whereby said bridge circuit may be energized, detector means connected to said bridge circuit whereby a change in acoustic impedance of said body of water in the vicinity of said transducer caused by the wake of a vessel and reflected in an impedance change of said bridge circuit may be detected.

4. Apparatus for detecting a change in acoustic impedance of a liquid medium comprising a hydrophone having an electrical circuit and adapted to be positioned in a liquid medium, said electrical circuit comprising a magnetostrictive element, an energizing coil wound on said magnetostrictive element, a feedback coil wound on said magnetostrictive element, said energizing coil and said feedback coil coupled through said magnetostrictive element, a bridge circuit, an oscillator circuit including an amplifier, means connecting said feedback coil to said oscillator circuit, means connecting said oscillator circuit to said bridge circuit whereby said bridge circuit may be energized, a variable calibrating resistor, means serially connecting said energizing coil and said calibrating resistor to a leg of said bridge circuit, whereby said bridge circuit may be balanced, a second amplifier circuit including a bandpass filter connected to said bridge circuit whereby an unbalance in said bridge circuit caused by a change in the acoustic impedance of said liquid medium in the vicinity of said hydrophone may be detected.

References Cited in the file of this patent

UNITED STATES PATENTS

| 1,811,128 | Harrison | June 23, 1931 |
| 2,392,758 | Minton | Jan. 8, 1946 |
| 2,419,573 | Lawlor | Apr. 29, 1947 |
| 2,509,401 | Scheiner | May 30, 1950 |
| 2,584,128 | Hildyard | Feb. 5, 1952 |
| 2,586,745 | Tullos | Feb. 19, 1952 |
| 2,649,579 | Alexander | Aug. 18, 1953 |
| 2,715,717 | Keithley | Apr. 16, 1955 |

FOREIGN PATENTS

| 103,111 | Switzerland | Feb. 1, 1924 |

OTHER REFERENCES

Electronics, p. 126, April 1949, copy in Scientific Library.

Terman: Radio Engineering, p. 302, 1947, 3 ed.